(12) United States Patent
Smith

(10) Patent No.: US 7,198,122 B1
(45) Date of Patent: Apr. 3, 2007

(54) DEVICE FOR TRANSPORTING A STROLLER

(76) Inventor: Stephen E. Smith, 6921 Amber Valley Dr., Indianapolis, IN (US) 46237

(*) Notice: Subject to any disclaimer, the term of this patent is extended or adjusted under 35 U.S.C. 154(b) by 303 days.

(21) Appl. No.: 10/893,058

(22) Filed: Jul. 19, 2004

(51) Int. Cl.
*B62D 61/08* (2006.01)

(52) U.S. Cl. .................. 180/12; 180/216; 180/65.1

(58) Field of Classification Search .............. 180/11, 180/12, 13, 65.1, 210, 215, 216; 280/304.1
See application file for complete search history.

(56) References Cited

U.S. PATENT DOCUMENTS

| | | | | |
|---|---|---|---|---|
| 3,437,161 | A | * | 4/1969 | Ufford ..................... 180/181 |
| 3,921,740 | A | * | 11/1975 | Forster ..................... 180/213 |
| 4,257,644 | A | * | 3/1981 | Stephens ................. 296/65.04 |
| 4,518,057 | A | * | 5/1985 | McCallum ................. 180/210 |
| 4,629,950 | A | | 12/1986 | Ching |
| 4,776,415 | A | | 10/1988 | Brice |
| 4,898,508 | A | * | 2/1990 | Hayata ..................... 414/476 |
| 5,026,225 | A | * | 6/1991 | McIntyre .................... 410/23 |
| 5,094,314 | A | * | 3/1992 | Hayata ..................... 180/217 |
| 5,207,286 | A | * | 5/1993 | McKelvey ................... 180/13 |
| 5,439,071 | A | | 8/1995 | Rodriguez-Ferre |
| 5,816,352 | A | | 10/1998 | Hacker |
| 5,826,670 | A | * | 10/1998 | Nan ........................... 180/15 |
| 6,148,942 | A | | 11/2000 | Mackert, Sr. |
| D436,899 | S | | 1/2001 | Suzuki |
| 6,302,421 | B1 | | 10/2001 | Lee |
| 6,360,836 | B1 | | 3/2002 | Milano, Jr. et al. |
| 6,419,036 | B1 | * | 7/2002 | Miglia ........................ 180/9.1 |
| 6,688,414 | B1 | * | 2/2004 | Bruno ........................ 180/233 |
| 6,766,871 | B2 | * | 7/2004 | Sawyer ...................... 180/13 |
| 2002/0109336 | A1 | | 8/2002 | Suzuki |
| 2003/0071441 | A1 | | 4/2003 | Yeh |

* cited by examiner

*Primary Examiner*—Jeff Restifo

(57) ABSTRACT

A device for transporting strollers includes a base member having a plurality of compartments, a plurality of wheels for supporting the base member wherein two such wheels are mounted adjacent the rear portion and another wheel is pivotally mounted to the base member. A plurality of elongated straps are secured to the top surface and to a stroller positioned thereon respectively. The device further includes a mechanism for rotating at least two of the plurality of wheels and a hand-operable remote control unit for selectively transmitting RF signals to the rotating mechanism. The rotating mechanism includes a plurality of motors, at least one power source disposed within select ones of the plurality of compartments, a receiver for receiving the RF signals generated from the remote control, and a microprocessor electrically coupled to the receiver.

18 Claims, 5 Drawing Sheets

US 7,198,122 B1

DEVICE FOR TRANSPORTING A STROLLER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to mobile transport devices and, more particularly, to a device for transporting strollers between remote locations.

2. Prior Art

It is well known that the conventional baby cart is manually pushed forward or back, and mainly used outdoors in terrain of varying degrees. Normally, a person who fosters her baby (still in infancy and not walking) at home carries it or places it in a bed or cradle so that the person can do chores or other work.

Carrying a baby on the back often hinders the operations of one's extremities. A baby placed in a stationary bed or cradle will feel lonely and cry before long. Even if it is placed in a powered cradle with a regular swing, it often feels insecure and may cry after a while.

In view of the above, a need remains for a device for transporting strollers between remote locations so that a parent can be free to do work and still monitor the baby without having to physically push a stroller.

BRIEF SUMMARY OF THE INVENTION

In view of the foregoing background, it is therefore an object of the present invention to provide a device for transporting baby strollers. These and other objects, features, and advantages of the present invention are provided by a baby stroller transport device for selectively controlling the movement of a baby stroller.

The device includes a base member having front and rear portions and a substantially planar top surface provided with a centrally disposed longitudinal axis. The base member further has a plurality of sidewalls integral therewith and extending upwardly therefrom. The base member is provided with a plurality of compartments oppositely spaced from the axis and includes a port disposed adjacent select ones of the plurality of compartments and electrically coupled thereto for receiving a plug for re-charging a battery.

The device further includes a plurality of wheels for supporting the base member above a ground surface and for assisting in the movement of the device between remote locations during operating conditions. Two such wheels are preferably mounted adjacent the rear portion and another wheel is spaced therefrom adjacent the front portion for being swiveled between select directions so that a user can effectively guide the device along a non-linear path.

A plurality of elongated straps having opposed end portions are secured to the top surface and to a stroller positioned thereon, respectively, so that the stroller can be maintained at a substantially stable position during operating conditions. The device further includes a handle attached to the top surface for being grasped by a user during operating conditions and a mechanism for rotating at least two of the plurality of wheels in a predetermined direction.

The device further includes a hand-operable remote control unit for selectively transmitting RF signals to the rotating mechanism and thereby causing movement of the device. The remote control unit includes a joystick for selectively controlling the operation of the plurality of motors and a switch for toggling the remote control unit between on and off positions. A light emitting diode is electrically coupled to the switch and is illuminated when the switch is toggled to an on position.

The rotating mechanism includes a plurality of motors having a respective output shaft extending outwardly and orthogonally therefrom. The output shaft is connected to the two wheels respectively for contemporaneously rotating the two wheels forward when the shaft is rotated clockwise and for rotating the two wheels backwards when the shaft is rotated counter clockwise.

The rotating mechanism further includes a housing having a substantially cylindrical shape disposed about the plurality of motors and substantially medially of the two wheels and at least one power source disposed within select ones of the plurality of compartments. Such power sources are electrically coupled to the plurality of motors respectively.

The rotating mechanism further includes a receiver for receiving the RF signals generated from the remote control and a microprocessor electrically coupled to the receiver for cooperating therewith to process the RF signals and send corresponding output signals to the plurality of motors during operating conditions.

In an alternate embodiment, the rotating mechanism further includes a battery charging station electrically coupled to a vehicle 12-volt receptacle. In yet another embodiment, the rotating mechanism further includes a battery charging station electrically coupled to an AC/DC outlet.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
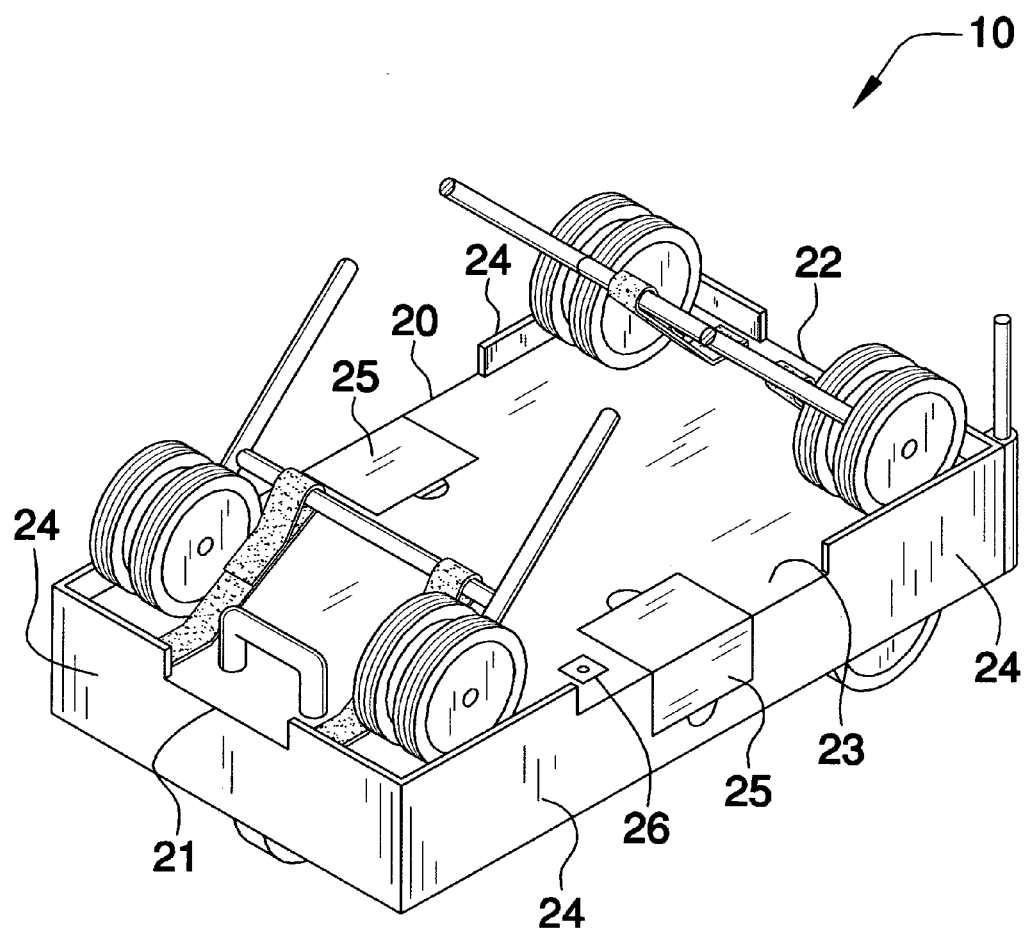
FIG. 1 is a perspective view showing a device supporting a stroller thereon and for transporting such a device between remote locations, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1–8 by the reference numeral 10 and is intended to provide a device for transporting strollers. It should be understood that the device 10 may be used to transport many different types of objects and should not be limited to only strollers.

Figure 2:
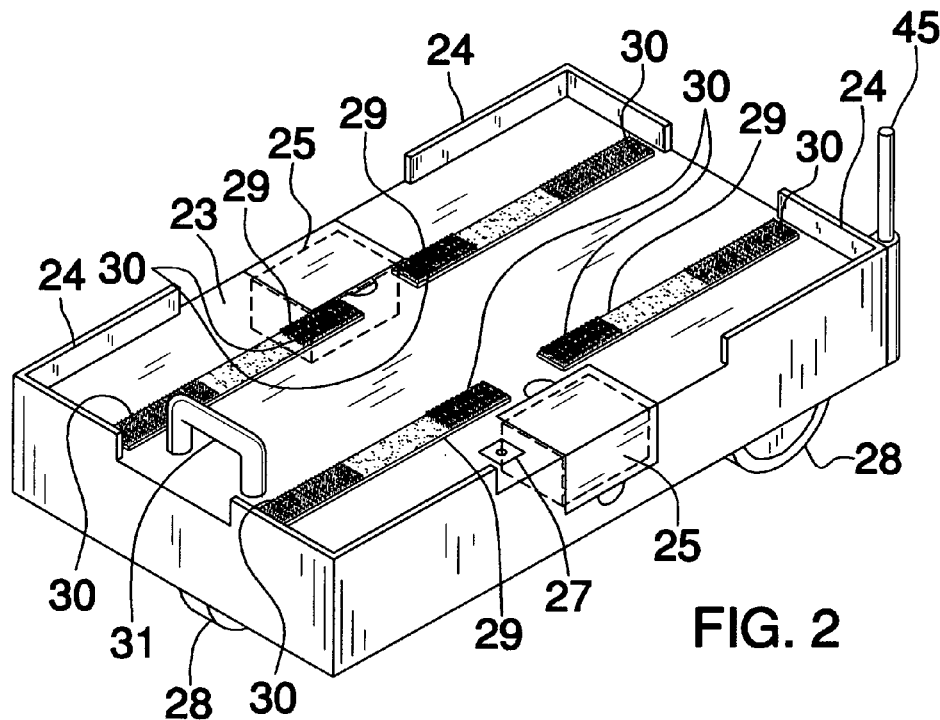
FIG. 2 is a perspective view showing the top surface and plurality of compartments of the present invention.
Figure 5:
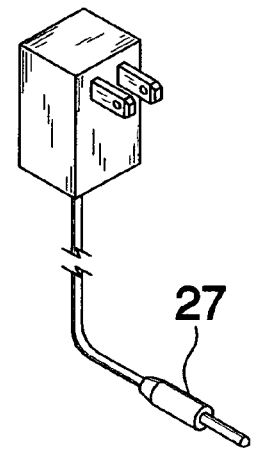
FIG. 5 is a perspective view showing the plug for re-charging a battery.

Initially referring to FIGS. 1 and 2, the device 10 includes a base member 20 having front 21 and rear 22 portions and a substantially planar top surface 23 provided with a centrally disposed longitudinal axis (not shown). The base member 20 further has a plurality of sidewalls 24 integral therewith and extending upwardly therefrom. The base member 20 is provided with a plurality of compartments 25 oppositely spaced from the axis and includes a port 26 disposed adjacent select ones of the plurality of compartments 25 and electrically coupled thereto for receiving a plug 27, as shown in FIG. 5, for re-charging a battery. The compartments 25 protect a battery from the weather in an external environment, thereby prolonging battery life.

Figure 3:
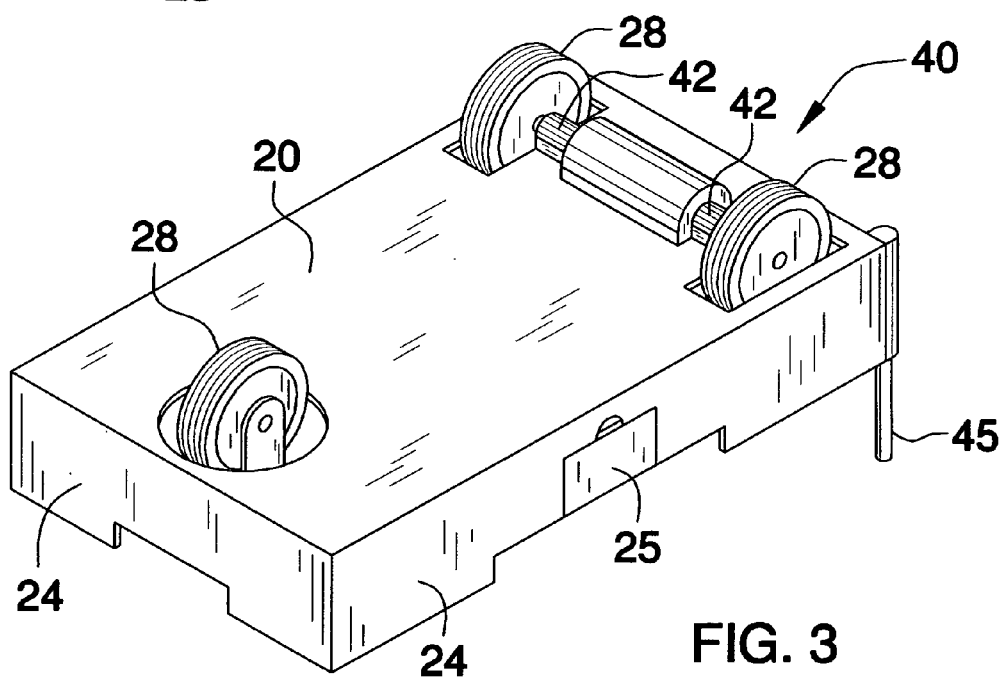
FIG. 3 is a perspective view showing the bottom surface and plurality of wheels of the present invention.

Now referring to FIG. 3, the device 10 further includes a plurality of wheels 28 for supporting the base member 20 above a ground surface and for assisting in the movement of the device 10 between remote locations during operating conditions. The wheels 28 are preferably pneumatic tires for traversing uneven terrain and providing a smooth ride for the stroller, but may be other rubber wheels as commonly known in the industry. Two such wheels 28 are mounted adjacent the rear portion 22 and another wheel 28 is spaced therefrom adjacent the front portion 21. Such a wheel 28 is pivotally mounted to the base member 20 for being swiveled between select directions so that a user can effectively guide the device 10 along a non-linear path. The swiveling action gives the device 10 a short turning radius, enabling a user to maneuver the present invention in tight locations.

Now referring back to FIGS. 1 and 2, a plurality of elongated straps 29 having opposed end portions 30 are secured to the top surface 23 and to a stroller positioned thereon, respectively, so that the stroller can be maintained at a substantially stable position during operating conditions. The straps 29 are preferably formed from VELCRO material for easy fastening and release. Of course, other suitable fastening members such as quick-release latches, for example, can be employed, without departing from the true scope of the invention. To further assist a user during operating conditions, the device 10 includes a handle 31 attached to the top surface 23. Advantageously, the present invention further includes a mechanism 40 for rotating at least two of the plurality of wheels 28 in a predetermined direction.

Figure 4:
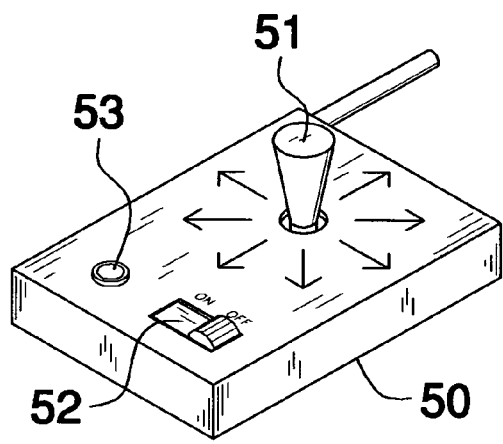
FIG. 4 is a perspective view showing the joystick.

Now referring to FIG. 4, the device 10 further includes a hand-operable remote control unit 50 for selectively transmitting RF signals to the rotating means 40 and thereby causing movement of the device 10. The remote control unit 50 includes a joystick 51 for selectively controlling the operation of the plurality of motors 41 and a switch 52 for toggling the remote control unit 50 between on and off positions. A light emitting diode 53 is electrically coupled to the switch 52 and is illuminated when the switch 52 is toggled to an on position.

Figure 7:
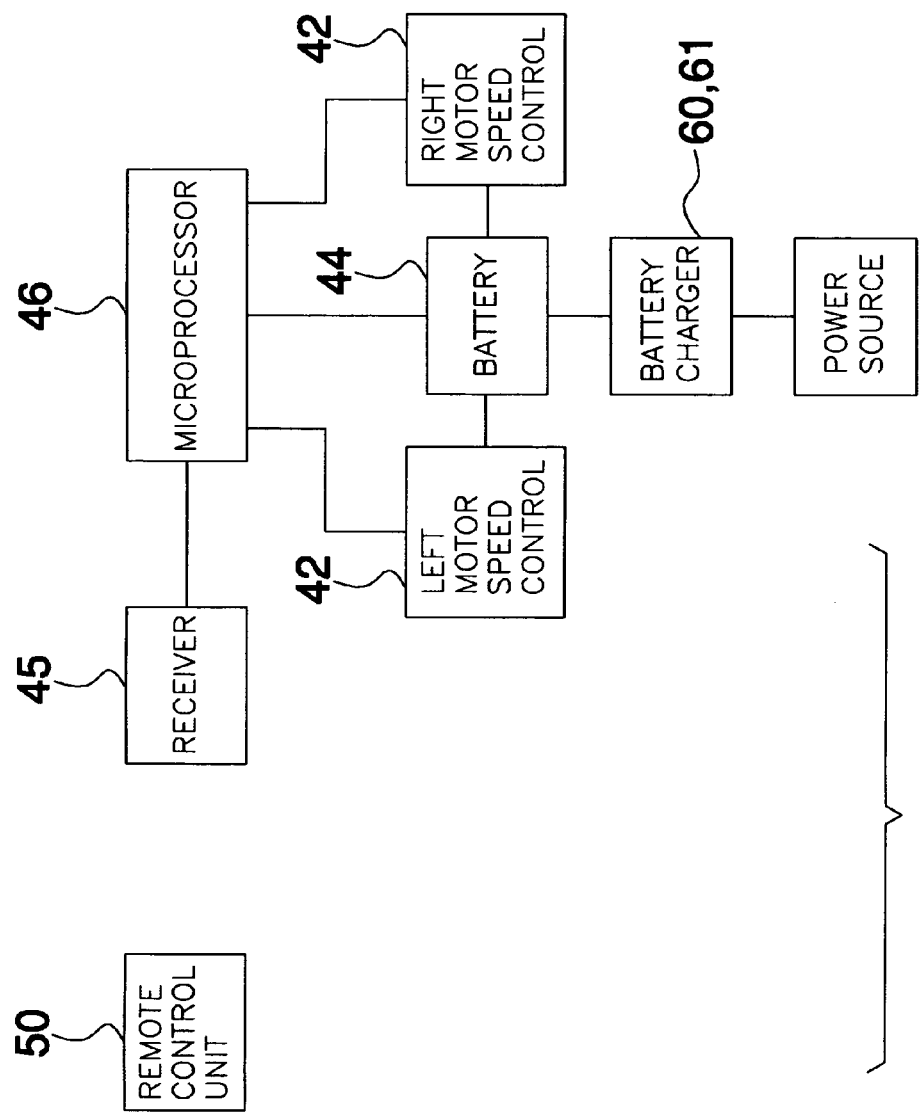
FIG. 7 is a schematic block diagram of the rotating mechanism.
Figure 8:
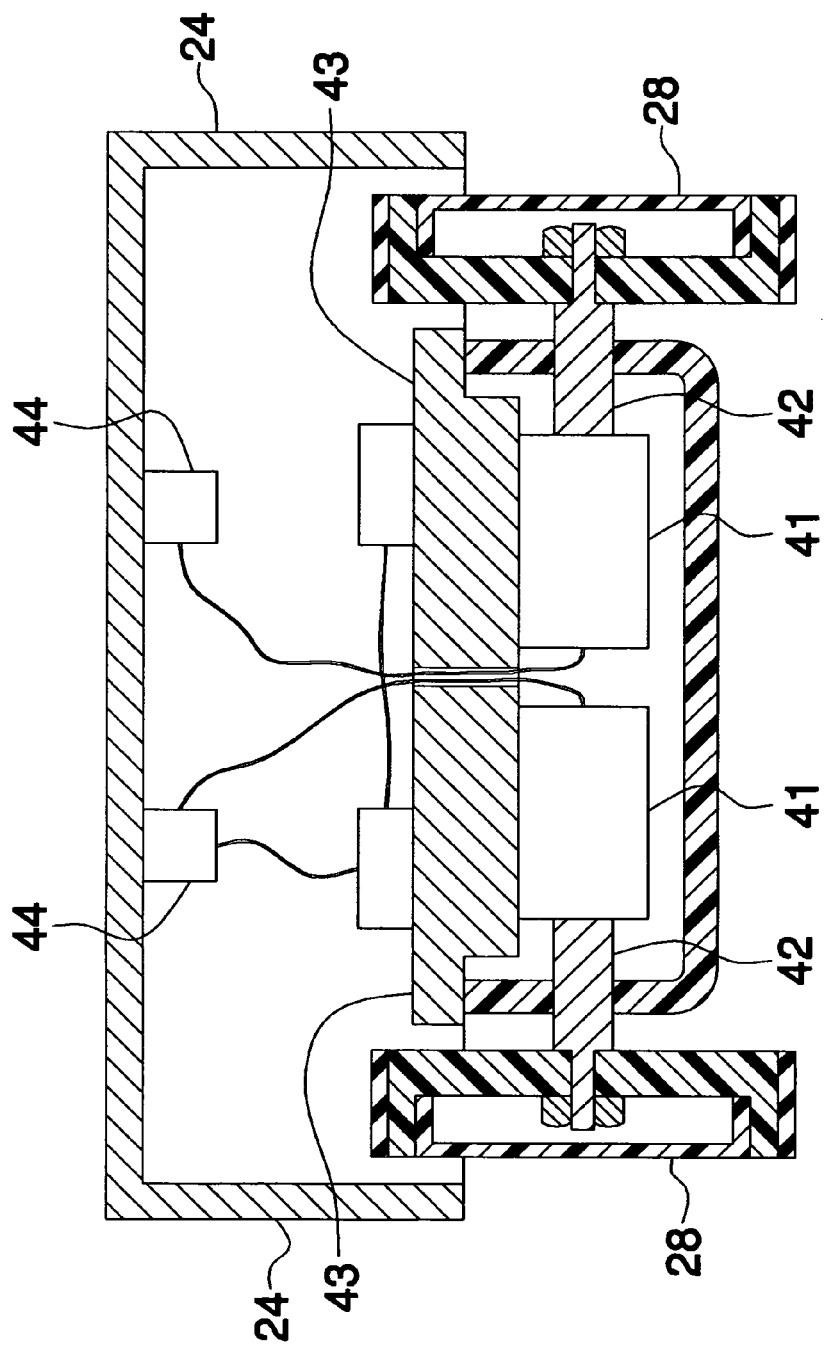
FIG. 8 is a cross-sectional view of the rotating mechanism, taken along line 8—8.

Now referring to FIGS. 7 and 8, rotating mechanism 40 includes a plurality of motors 41 having a respective output shaft 42 extending outwardly and orthogonally therefrom. The output shaft 42 is connected to two wheels 28 respectively for contemporaneously rotating the two wheels 28 forward when the shaft 42 is rotated clockwise and for rotating the two wheels 28 backwards when the shaft 42 is rotated counter clockwise.

Now referring to FIGS. 1 and 8, the rotating mechanism 40 further includes a housing 43 having a substantially cylindrical shape disposed about the plurality of motors 41 and substantially medially of the two wheels 28. At least one power source 44 is disposed within select ones of the plurality of compartments 25 and is electrically coupled to the plurality of motors 41 respectively. The housing 43 protects the plurality of motors 41 from dirt and debris encountered by the device 10 under operating conditions. It also increases safety by preventing access to the rotating output shaft 42 during operating conditions.

Now referring to FIGS. 1 and 7, the rotating mechanism 40 further includes a receiver 45 for receiving the RF signals generated from the remote control 50 and a microprocessor 46 electrically coupled to the receiver 45. The microprocessor 46 processes the RF signals and sends corresponding output signals to the plurality of motors 41 during operating conditions. Advantageously, the receiver 45 allows a user to remotely operate the device 10.

Figure 6A:
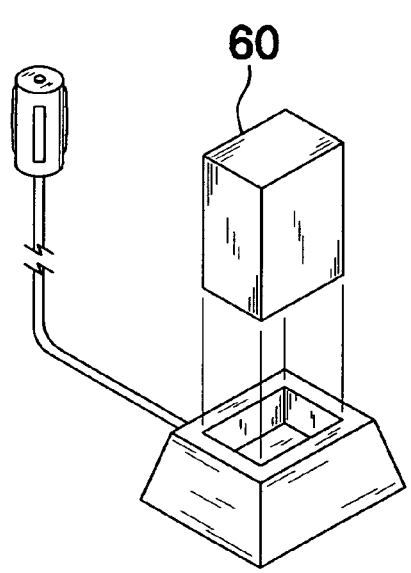
FIG. 6*a* is a perspective view showing the battery charging station electrically connectable to a 12-volt vehicle receptacle.
Figure 6B:
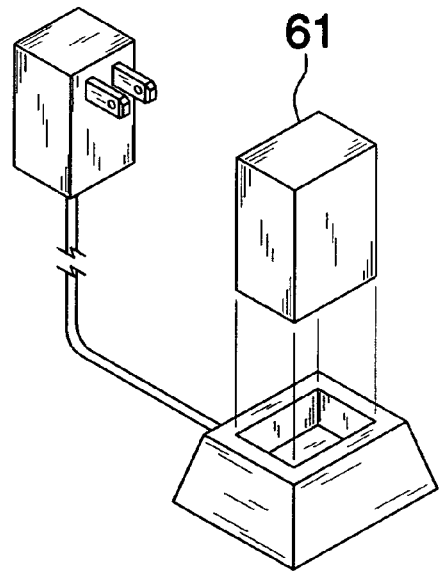
FIG. 6*b* is a perspective view showing the battery charging station electrically connectable to an AC/DC outlet.

In an alternate embodiment, the rotating mechanism 40' further includes a battery charging station 60 electrically coupled to a vehicle 12-volt receptacle, as shown in FIG. 6a. In yet another alternate embodiment, the rotating mechanism 40" further includes a battery charging station 61 electrically coupled to an AC/DC outlet, as shown in FIG. 6b.

The device 10 fulfills a need for a self-propelled stroller transporter that is operable by a remote control. The device 10 is easy to use and saves parents and other adult caretakers from the fatigue associated with pushing traditional strollers. The device 10 is ideal for walks around the neighborhood or on trips to the mall or zoo. Instead of struggling to push a child in a stroller on grass, gravel or inclines, a parent can use this battery-powered device by remote control. The device 10 would be especially appealing to grandparents and females with limited upper body strength or other physical limitations and is also useful when the caretaker needs to use his/her hands for other chores.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A baby stroller transport device for selectively controlling the movement of a baby stroller, said device comprising:
   a base member having front and rear portions and a substantially planar top surface provided with a centrally disposed longitudinal axis, said base member further having a plurality of sidewalls integral therewith and extending upwardly therefrom, said base member being provided with a plurality of compartments oppositely spaced from the axis;
   a port disposed adjacent select ones of said plurality of compartments and electrically coupled thereto, said port for receiving a plug for re-charging a battery;
   a plurality of wheels for supporting said base member above a ground surface and for assisting in the movement of said device between remote locations during operating conditions;
   a plurality of elongated straps having opposed end portions secured to said top surface and to a stroller positioned thereon respectively so that the stroller can be maintained at a substantially stable position during operating conditions;
   a handle attached to said top surface for being grasped by a user during operating conditions;
   means for rotating at least two of said plurality of wheels in a predetermined direction; and
   a hand-operable remote control unit for selectively transmitting RF signals to said rotating means and thereby causing movement of said device
   wherein said rotating means comprises
      first and second motors juxtaposed between said at least two wheels, each of said first and second motors having an output shaft extending outwardly therefrom and being directly connected to said at least two wheels respectively,
      first and second power sources electrically coupled directly to said first and second motors respectively, and
      a cylindrical housing encasing said first and second motors and spaced subjacent to said first and second power sources, said housing being medially disposed between said at least two wheels.

2. The device of claim 1, wherein said at least two wheels are mounted adjacent said rear portion and another of said plurality of wheels is spaced therefrom adjacent said front portion.

3. The device of claim 1, wherein said remote control unit further comprises:
   a joystick for selectively controlling operation of said plurality of motors;
   a switch for toggling said remote control unit between on and off positions; and
   a light emitting diode electrically coupled to said switch, said diode being illuminable when said switch is toggled to an on position.

4. The device of claim 1, wherein said rotating means further comprises: a battery charging station electrically coupled to a vehicle 12-volt receptacle.

5. The device of claim 1, wherein said rotating means further comprises: a battery charging station electrically coupled to an AC/DC outlet.

6. The device of claim 1, wherein said another wheel is pivotally mounted to said base member for being swiveled between select directions so that a user can effectively guide said device along a non-linear path.

7. A combined baby stroller and transport device for selectively controlling the movement of a baby stroller, said combined baby stroller and transport device comprising:
   a base member having front and rear portions and a substantially planar top surface provided with a centrally disposed longitudinal axis, said base member further having a plurality of sidewalls integral therewith and extending upwardly therefrom, said base member being provided with a plurality of compartments oppositely spaced from the axis;
   a port disposed adjacent select ones of said plurality of compartments and electrically coupled thereto, said port for receiving a plug for re-charging a battery;
   a plurality of wheels for supporting said base member above a ground surface and for assisting in the movement of said device between remote locations during operating conditions;
   a plurality of elongated straps having opposed end portions secured to said top surface;
   a handle attached to said top surface for being grasped by a user during operating conditions;
   means for rotating at least two of said plurality of wheels in a predetermined direction, said at least two wheels are mounted adjacent said rear portion and another of said plurality of wheels is spaced therefrom adjacent said front portion; and
   a hand-operable remote control unit for selectively transmitting RF signals to said rotating means and thereby causing movement of said device;
   a baby stroller having first and second pairs of wheels provided with a support arm horizontally extending therebetween, each of said first and second pairs of wheels being registered at corresponding corners of said top surface of said base member and abutting against said sidewalls respectively, wherein said straps have opposed ends directly anchored to said top surface of said base member and said support arms of said baby stroller respectively for prohibiting said first and second pairs of wheels from disengaging said sidewalls respectively.

8. The device of claim 7, wherein said rotating means comprises:
   a plurality of motors having a respective output shaft extending outwardly and orthogonally therefrom, said output shaft being connected to said two wheels respectively for contemporaneously rotating said two wheels forward when said shaft is rotated clockwise and for rotating said two wheels backwards when said shaft is rotated counter clockwise;
   a housing having a substantially cylindrical shape disposed about said plurality of motors and substantially medially of said two wheels;
   at least one power source disposed within select ones of said plurality of compartments and being electrically coupled to said plurality of motors respectively;
   a receiver for receiving said RF signals generated from said remote control; and
   a microprocessor electrically coupled to said receiver and for cooperating therewith to process said RF signals and send corresponding output signals to said plurality of motors during operating conditions.

9. The device of claim 7, wherein said remote control unit further comprises:
   a joystick for selectively controlling operation of said plurality of motors;
   a switch for toggling said remote control unit between on and off positions; and
   a light emitting diode electrically coupled to said switch, said diode being illuminable when said switch is toggled to an on position.

10. The device of claim 7, wherein said rotating means further comprises: a battery charging station electrically coupled to a vehicle 12-volt receptacle.

11. The device of claim 7, wherein said rotating means further comprises: a battery charging station electrically coupled to an AC/DC outlet.

12. The device of claim 7, wherein said another wheel is pivotally mounted to said base member for being swiveled between select directions so that a user can effectively guide said device along a non-linear path.

13. A baby stroller transport device for selectively controlling the movement of a baby stroller, said device comprising:
   a base member having front and rear portions and a substantially planar top surface provided with a centrally disposed longitudinal axis, said base member further having a plurality of sidewalls integral therewith and extending upwardly therefrom, said base member being provided with a plurality of compartments oppositely spaced from the axis;
   a port disposed adjacent select ones of said plurality of compartments and electrically coupled thereto, said port for receiving a plug for re-charging a battery;
   a plurality of wheels for supporting said base member above a ground surface and for assisting in the movement of said device between remote locations during operating conditions;
   a plurality of elongated straps having opposed end portions secured to said top surface and to a stroller positioned thereon respectively so that the stroller can be maintained at a substantially stable position during operating conditions;
   a handle attached to said top surface for being grasped by a user during operating conditions;
   means for rotating at least two of said plurality of wheels in a predetermined direction, said at least two wheels are mounted adjacent said rear portion and another of said plurality of wheels is spaced therefrom adjacent said front portion, said another wheel is pivotally mounted to said base member for being swiveled between select directions so that a user can effectively guide said device along a non-linear path, and
   a hand-operable remote control unit for selectively transmitting RF signals to said rotating means and thereby causing movement of said device.

14. The device of claim 13, wherein said rotating means comprises:
   a plurality of motors having a respective output shaft extending outwardly and orthogonally therefrom, said output shaft being connected to said two wheels respectively for contemporaneously rotating said two wheels forward when said shaft is rotated clockwise and for rotating said two wheels backwards when said shaft is rotated counter clockwise;
   a housing having a substantially cylindrical shape disposed about said plurality of motors and substantially medially of said two wheels;
   at least one power source disposed within select ones of said plurality of compartments and being electrically coupled to said plurality of motors respectively;
   a receiver for receiving said RF signals generated from said remote control; and
   a microprocessor electrically coupled to said receiver and for cooperating therewith to process said RF signals and send corresponding output signals to said plurality of motors during operating conditions.

15. The device of claim 13, wherein said remote control unit further comprises:
   a joystick for selectively controlling operation of said plurality of motors;
   a switch for toggling said remote control unit between on and off positions; and
   a light emitting diode electrically coupled to said switch, said diode being illuminable when said switch is toggled to an on position.

16. The device of claim 13, wherein said rotating means further comprises: a battery charging station electrically coupled to a vehicle 12-volt receptacle.

17. The device of claim 13, wherein said rotating means further comprises: a battery charging station electrically coupled to an AC/DC outlet.

18. The device of claim 13, wherein said another wheel is pivotally mounted to said base member for being swiveled between select directions so that a user can effectively guide said device along a non-linear path.

* * * * *